US010913409B2

(12) United States Patent
Raghunath et al.

(10) Patent No.: US 10,913,409 B2
(45) Date of Patent: *Feb. 9, 2021

(54) SYSTEMS AND METHODS FOR IDENTIFYING SENSOR LOCATION

(71) Applicant: Cummins Inc., Columbus, IN (US)

(72) Inventors: Ganesh Raghunath, Columbus, IN (US); Alok A. Joshi, Columbus, IN (US); Shu Li, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/786,664

(22) Filed: Feb. 10, 2020

(65) Prior Publication Data

US 2020/0180529 A1 Jun. 11, 2020

Related U.S. Application Data

(63) Continuation of application No. 15/869,450, filed on Jan. 12, 2018, now Pat. No. 10,562,472.

(51) Int. Cl.
*B60R 16/02* (2006.01)
*B60R 16/023* (2006.01)
*G05B 19/12* (2006.01)
*G07C 5/08* (2006.01)
*G07B 15/06* (2011.01)
*G05B 19/042* (2006.01)

(52) U.S. Cl.
CPC ........ *B60R 16/0232* (2013.01); *G05B 19/042* (2013.01); *G05B 19/12* (2013.01); *G07B 15/063* (2013.01); *G07C 5/085* (2013.01); *G05B 2219/25062* (2013.01); *G05B 2219/33192* (2013.01)

(58) Field of Classification Search
CPC .. B60R 16/0232; G05B 19/042; G05B 19/12; G05B 19/41875; G05B 2219/25062; G05B 2219/33192; G07B 15/063; G07C 5/085

See application file for complete search history.

(56) References Cited

U.S. PATENT DOCUMENTS

| 5,995,898 | A | 11/1999 | Tuttle |
| 6,350,274 | B1 | 2/2002 | Li |
| 7,786,864 | B1 | 8/2010 | Shostak et al. |
| 8,044,775 | B2 | 10/2011 | Pochy |
| 8,988,193 | B2 | 3/2015 | Bauchot et al. |
| 2005/0007450 | A1 | 1/2005 | Hill et al. |
| 2008/0174423 | A1 | 7/2008 | Breed |
| 2008/0216567 | A1 | 9/2008 | Breed |
| 2009/0121840 | A1 | 5/2009 | Bauchot et al. |
| 2011/0090052 | A1* | 4/2011 | Warner .............. H04Q 9/00 340/10.1 |
| 2012/0188105 | A1 | 7/2012 | Alkhalaf |
| 2012/0280812 | A1* | 11/2012 | Sheikman ........... G01S 13/825 340/539.13 |

FOREIGN PATENT DOCUMENTS

WO WO-2011/038764 A1 4/2011

* cited by examiner

*Primary Examiner* — Nader Bolourchi
(74) *Attorney, Agent, or Firm* — Foley & Lardner LLP

(57) ABSTRACT

Systems and apparatuses include a passive device coupled to a mounting boss arranged on a vehicle system, and a sensor structured to engage the mounting boss. The sensor includes a probe structured to sense a characteristic of the vehicle system, and a reader structured to send a query signal to the passive device and receive location data from the passive device associated with the mounting boss.

20 Claims, 2 Drawing Sheets

SYSTEMS AND METHODS FOR IDENTIFYING SENSOR LOCATION

RELATED APPLICATIONS

This application is a continuation application of U.S. patent application Ser. No. 15/869,450 filed Jan. 12, 2018, which claims the benefit of and priority to U.S. Provisional Patent Application No. 62/446,225 filed Jan. 13, 2017, each of which are incorporated herein by reference in their entirety.

TECHNICAL FIELD

The present disclosure relates to diagnostic systems for vehicles. More particularly, the present disclosure relates to systems and methods of identifying the location of sensors within a diagnostic system of a vehicle.

BACKGROUND

Vehicle diagnostic systems often include an array of sensors for monitoring various activities and conditions of a vehicle. Multiple sensors measuring the same physical properties are often used at various locations (e.g., two NOx measurements may be taken at each of an aftertreatment system inlet and an aftertreatment system outlet, five exhaust gas temperature measurements may be taken at an inlet and an outlet of each of a number of aftertreatment catalysts).

Typically, a mechanical Poka-Yoke, or mechanical error prevention mechanism, is utilized to inhibit sensors from being installed in an incorrect location and to associate the sensor with an engine control module (ECM). For example, a first probe or sensor may have a thread pattern of M20×1.5 with a first connector key and only one sensor mounting boss may be structured to fit that thread pattern. As a result, during installation either at a plant or during service, the first sensor can only be mounted to its designated location (i.e., the matching sensor mounting boss). The use of mechanical error prevention mechanisms result in a proliferation of parts because each sensor (e.g., one sensor of multiple duplicative sensors) requires different physical attributes and therefore different part numbers. Resulting increases in logistical complexity of installation and maintenance systems, as well as supply chains, causes the cost of parts and installation to increase both for initial assembly and for service.

SUMMARY

One embodiment relates to an apparatus that includes a sensor including a probe, a reader, and a communication bus. The probe is structured to sense a characteristic of a vehicle system. The reader is structured to send a query signal wirelessly and receive location data from a passive device associated with a sensor mounting position. The communication bus is in communication with the probe and the reader and structured to communicate the characteristic and the location data to a vehicle controller.

Another embodiment relates to a system that includes a passive device and a sensor. The passive device is coupled to a mounting boss arranged on a vehicle system. The sensor is structured to engage the mounting boss and includes a probe structured to sense a characteristic of the vehicle system, and a reader structured to send a query signal to the passive device and receive location data from the passive device associated with the mounting boss.

Another embodiment relates to a method that includes installing a sensor in a mounting boss of a vehicle system, sending a query from a reader of the sensor to a passive device associated with the mounting boss, receiving the query with a passive device, sending location data from the passive device to the reader, sending the location data from the reader to a vehicle controller, sending sensor output signals from the sensor to the vehicle controller, and associating the location data with the sensor output signals in the vehicle controller.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for model based catalyst diagnostics. The various concepts introduced above and discussed in greater detail below may be implemented in any number of ways, as the concepts described are not limited to any particular manner of implementation. Examples of specific implementations and applications are provided primarily for illustrative purposes.

Referring the figures generally, the various embodiments disclosed herein relate to systems, apparatuses, and methods for identifying a location of a sensor within a sensor array without the use of mechanical aids. The following disclosure and claims aim to provide an electronic approach for identifying individual sensors and their locations without the need for a mechanical error prevention mechanism. The claimed apparatuses, systems, and methods eliminate the cost and inconvenience of mechanical error prevention mechanisms thereby improving current sensor location identification systems.

Figure 1:
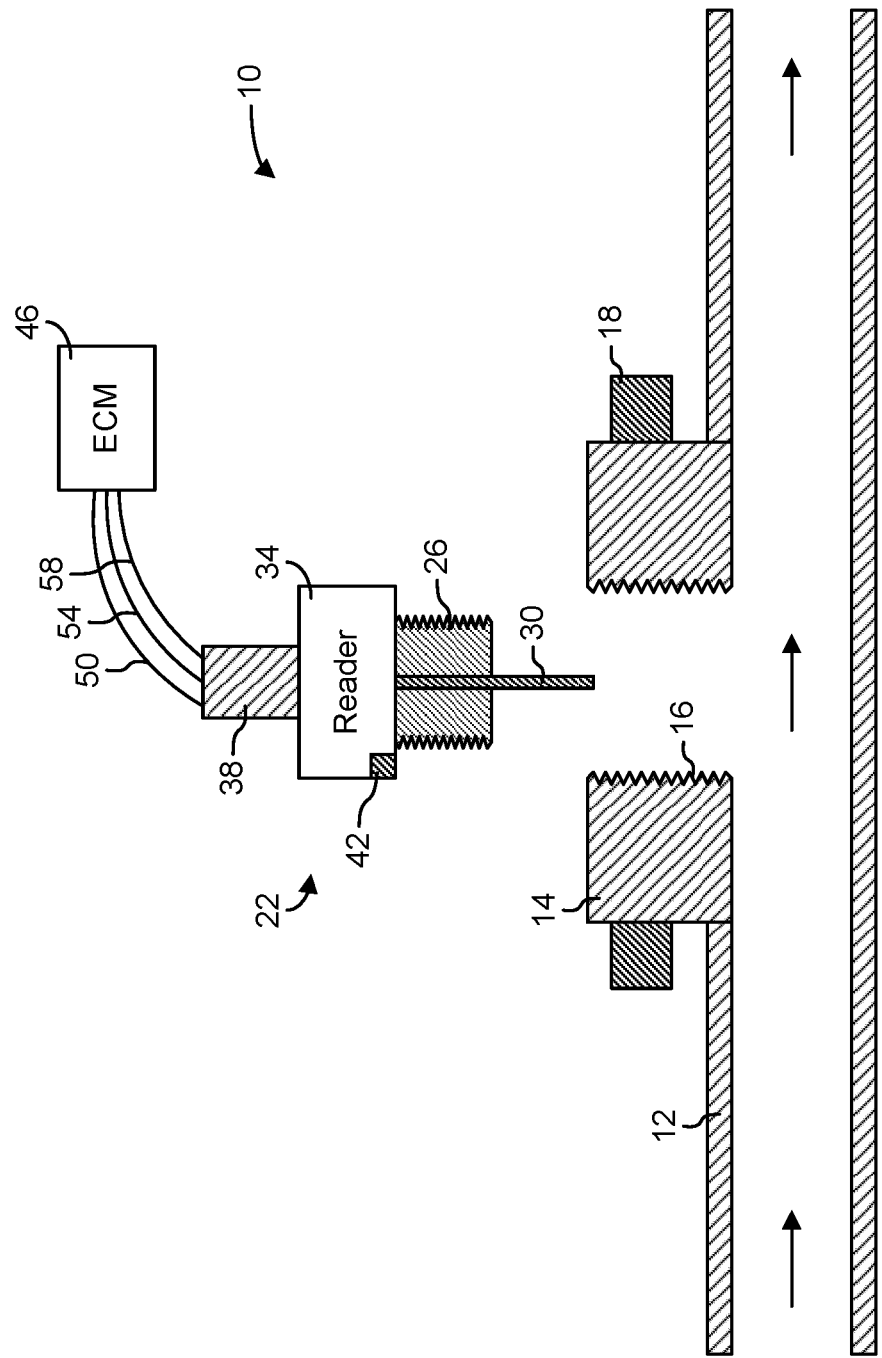
FIG. 1 is a schematic diagram of a sensor system according to an example embodiment.

As shown in FIG. 1, a sensor identification system 10 is associated with a vehicle system in the form of an aftertreatment system exhaust passage 12 fitted with a mounting boss 14. In the illustrated embodiment, the exhaust passage 12 provides a flow path for exhaust gases from an outlet of a combustion chamber to a catalyst or another component of an aftertreatment system. In some embodiments, the mounting boss 14 is arranged in another component or another vehicle system. For example, the mounting boss 14 may be positioned to monitor engine oil levels or temperatures, engine knock, or another characteristic of the aftertreatment system, engine, or another vehicle system. The specific vehicle system monitored is not limited to the inventive concepts disclosed herein. In other words, the mounting boss 14 can be located anywhere within the vehicle or be positioned to monitor any vehicle system.

The mounting boss 14 includes a boss mounting feature 16 in the form of female threads. In some embodiments, the boss mounting feature 16 can include a quick-connect structure, a brazing boss, a twist-lock structure, or another mounting structure used to connect a sensor to the system.

As also shown in FIG. 1, a passive device in the form of a passive radio-frequency identification (RFID) transponder 18 is arranged adjacent the mounting boss 14. In one embodiment, the passive RFID transponder 18 is annular and substantially surrounds or encompasses the mounting boss 14. In some embodiments, the passive RFID transponder 18 is arranged near the mounting boss 14 and within an RFID range or a predetermined communication range. In one embodiment, the RFID range is about five millimeters (5 mm). In some embodiments, the RFID range is between about two millimeters (2 mm) and about thirty millimeters (30 mm). In one embodiment, the passive RFID transponder is embedded within the mounting boss 14 or formed as a part of the mounting boss 14. In one embodiment, the passive RFID transponder 18 is an off-the-shelf transponder that can operate in environments up to or above two-hundred degrees Celsius (200° C.).

The passive RFID transponder 18 stores location data in the form of a location code that identifies the specific location of the associated mounting boss 14. In some embodiments, the location code is an alphanumeric code that can be referenced in a database.

A sensor 22 includes a sensor mounting feature 26 sized to be received with the boss mounting feature 16, a probe 30 that senses a characteristic of the flow of exhaust gas and produces a sensor signal, a reader in the form of an RFID reader 34 that selectively communicates with the passive RFID transponder 18, and a communication bus 38 in communication with the probe 30 and the RFID reader 34.

In the illustrated embodiment, the sensor mounting feature 26 includes male threads sized to engage the female threads of the boss mounting feature 16. In some embodiments, the sensor mounting feature 26 is arranged to engage and interact with the boss mounting feature 16 (e.g., quick-connect structure).

The illustrated probe 30 is a heated exhaust gas oxygen probe or sensor and includes internal components as is known in the art. In some embodiments, a different sensor type (e.g., a temperature sensor) can be used to determine another characteristic, as desired.

The RFID reader 34 is embedded on the sensor 22 with any other signal processing electronics included with the probe 30. The RFID reader 34 includes a reader antenna 42 that communicates with the RFID transponder 18 by sending and receiving signals. The reader antenna 42 is structured to communicate within the RFID range discussed above with respect to the passive RFID transponder 18.

The communication bus 38 receives signals from the probe 30 and the RFID reader 34 and connects the sensor 22 to a controller in the form of an engine control module (ECM) 46. The illustrated communication bus 38 communicates via a first port and an input wire 50 that transmits excitation energy and data signals from the ECM 46 to the sensor 22, a second port and a sensor output wire 54 that transmits sensor signals from the probe 30 to the ECM 46, and a third port and a location wire 58 that transmits the location data from the RFID reader 34 to the ECM 46.

In some constructions, the location wire 58 is eliminated and the location data is communicated to the ECM 46 over the sensor output wire 54. For example, when the sensor 22 is a datalink sensor, the location data can be communicated with a Controller Area Network (CAN) message by adding one Parameter Group Number (PGN). In another example, when the sensor 22 is an analog sensor, a pulse width modulated (PWM) output may be used, or the location data may be output by sacrificing sensor output data during a certain time period after key-on to provide a constant voltage/current level that identifies the sensor location (e.g., for 3 locations, the sensor will output 0V corresponding to a first location, 2.5V corresponding to a second location, and 5V corresponding to a third position, for 100 ms after key-on).

In operation, the sensor 22 is installed into the mounting boss 14 and the wires 50, 54, 58 are connected to the communication bus 38. Once the sensor 22 receives power from the input wire 50, the RFID reader 34 transmits a query via the reader antenna 42 within the RFID range. The passive RFID transponder 18 associated with the mounting boss 14 is within the RFID range and receives the query, and sends a location signal back to the RFID reader 34 in response. The RFID reader 34 interprets the location signal and sends location data to the ECM 46 via the location wire 58. The ECM 46 receives the location data, and associates the sensor signals received through the sensor output wire 54 with the location data. Once the sensor signals are associated with the location data, the ECM 46 recognizes the sensor 22 and uses the sensor signals within a control scheme (e.g., control of an aftertreatment system such as a three-way catalyst).

In some operations, the location wire 58 is eliminated and the location data is sent during a predetermined time window (e.g., when a user initiates a key-on condition, or when the sensor 22 is first installed). In one embodiment, the location data is sent using the sensor output wire 54. In operation, the RFID reader 34 transmits a query via the reader antenna 42, and the passive RFID transponder 18 receives the query, and subsequently sends a location signal back to the RFID reader 34. The RFID reader 34 interprets the location signal and sends location data in the form of a predetermined voltage to the ECM 46 via the sensor output wire 54. The ECM 46 receives the location data, and associates the sensor signals subsequently received through the sensor output wire 54 with the location data. Once the sensor signals are associated with the location data, the ECM 46 recognizes the sensor 22 and uses the sensor signals within a control scheme (e.g., control of an aftertreatment system such as a three-way catalyst).

Figure 2:
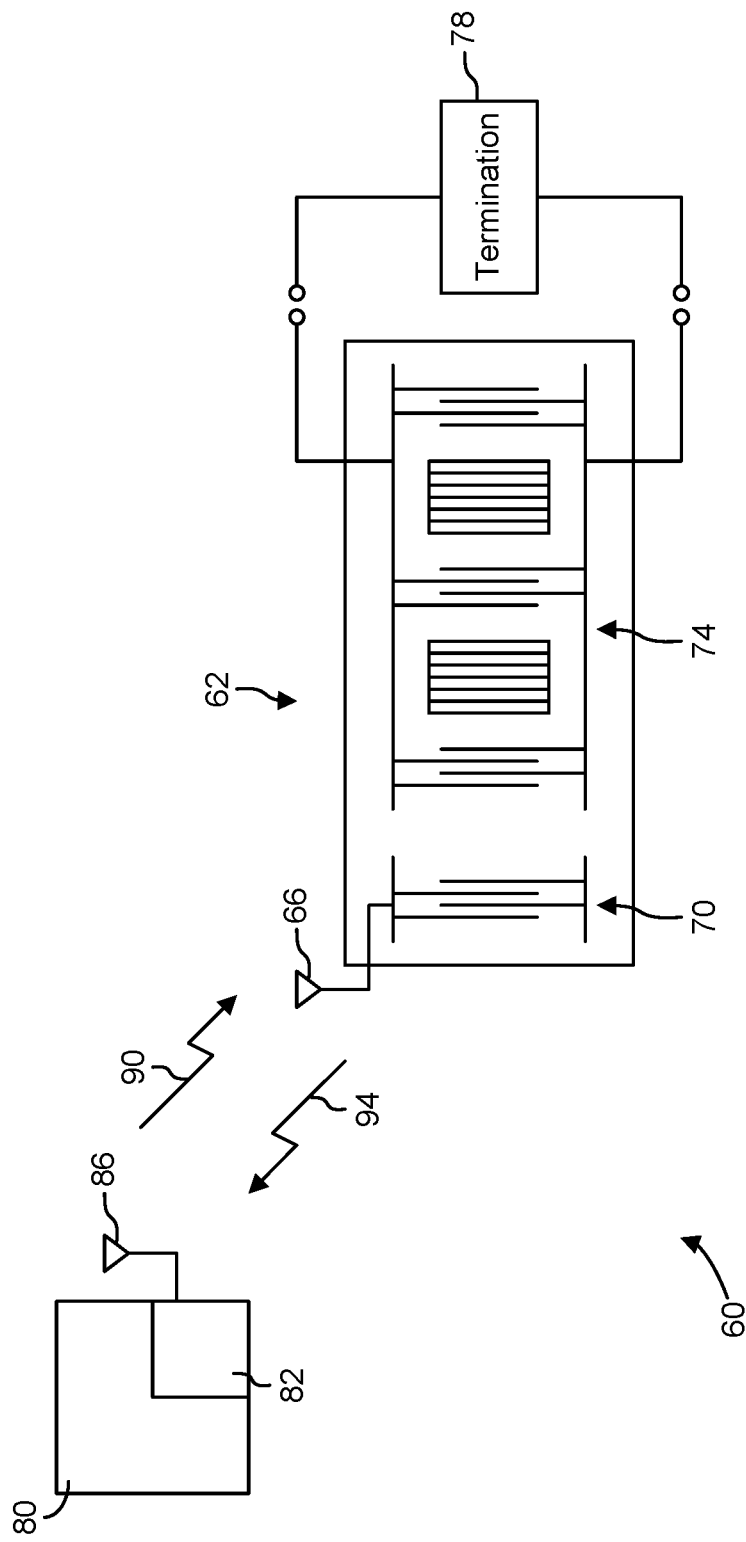
FIG. 2 is a schematic diagram of another sensor system according to an example embodiment.

As shown in FIG. 2, a sensor identification system 60 includes a passive device in the form of a passive surface acoustic wave (SAW) transponder 62 including a tag antenna 66 connected to an interdigital transducer (IDT) 70, a coded IDT 74, and a termination 78. The SAW transponder 62 is positioned adjacent a mounting boss or other sensor mounting location and defines a SAW range similar to the RFID range described above. The illustrated termination 78 is a short, although in some embodiments, the termination may be open depending on the desired response of the coded IDT 74.

The sensor identification system 60 also includes a sensor 80 that includes a reader arranged on the sensor 22 in the form of a SAW compatible requesting unit 82 including a reader antenna 86.

In operation, the sensor 80 is installed into the mounting boss and the requesting unit 82 transmits a query 90 via the reader antenna 86 within the SAW range. The passive SAW transponder 62 associated with the mounting boss is within the SAW range and receives the query via the tag antenna 66. The received query is converted by the IDT 70 into an acoustic transition received by the coded IDT 74. The received acoustic wave is translated into a coded acoustic wave by the coded IDT 74 and the termination 78, and the coded acoustic wave is transmitted back to the IDT 70. The IDT 70 translates the coded acoustic wave into a digital signal 94 that is transmitted from the tag antenna 66 to the reader antenna 86 and interpreted by the requesting unit 82. The requesting unit translates the digital signal 94 into location data and provides the location data to an ECM. The ECM can then associate the sensor 80 with the location data as discussed above.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings, and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
    a sensor including:
        a probe structured to sense a characteristic of a vehicle system; and
        a reader structured to send a query signal wirelessly and receive location data from a passive device associated with a sensor mounting position.
2. The apparatus of claim 1, wherein the reader is a Radio-Frequency Identification reader and the passive device is a passive Radio-Frequency Identification transponder.
3. The apparatus of claim 1, wherein the reader is a requesting unit and the passive device is a surface acoustic wave transponder.
4. The apparatus of claim 1, wherein the reader is structured to communicate with the passive device within a range between about two millimeters (2 mm) and about thirty millimeters (30 mm).
5. The apparatus of claim 1, wherein the reader is structured to send the location data to a vehicle controller.
6. The apparatus of claim 1, wherein the reader is structured to receive excitation energy and data signals from a vehicle controller.
7. The apparatus of claim 1, wherein the probe is a heated exhaust gas oxygen probe.
8. An apparatus comprising:
    an engine control module structured to:
        receive a system characteristic from a sensor probe;
        receive location data from a sensor reader structured to send a query signal to a passive device coupled to a mounting boss, and receive the location data from the passive device; and
        control a vehicle system at least partially based on the received system characteristic.
9. The apparatus of claim 8, wherein the engine control module is further structured to receive the system characteristic and the location data from a communication bus in communication with the sensor probe and the sensor reader.
10. The apparatus of claim 8, wherein the sensor reader is a Radio-Frequency Identification reader and the passive device is a passive Radio-Frequency Identification transponder.
11. The apparatus of claim 8, wherein the sensor reader is a requesting unit and the passive device is a surface acoustic wave transponder.
12. The apparatus of claim 8, wherein the passive device and the sensor reader are structured to define a predetermined communication range.
13. The apparatus of claim 12, wherein the predetermined communication range is between about two millimeters (2 mm) and about thirty millimeters (30 mm).
14. The apparatus of claim 8, wherein the passive device and the sensor reader are structured to communicate wirelessly.
15. A method comprising:
    sending location data from a passive device to a sensor reader;
    sending the location data from the sensor reader to a vehicle controller; and
    sending sensor output signals from a sensor probe to the vehicle controller.
16. The method of claim 15, further comprising sending a query from the sensor reader to the passive device including a radio-frequency signal sent from a reader antenna to the passive device, and wherein the passive device is a Radio-Frequency Identification transponder that sends the location data back to the reader antenna in response to the radio-frequency signal.
17. The method of claim 16, wherein the passive device is a surface acoustic wave transponder associated with a mounting boss that sends the location data back to the reader antenna in response to the radio-frequency signal.
18. The method of claim 15, wherein sending the location data includes sending a predetermined voltage to the vehicle controller via a sensor output wire.
19. The method of claim 18, wherein the predetermined voltage is sent during a predetermined time window.
20. The method of claim 18, wherein the predetermined voltage is sent during a key-on condition.

* * * * *